April 27, 1954

J. T. CARLETON 2,677,097

REGULATOR SYSTEM FOR GENERATORS

Filed Feb. 5, 1953

WITNESSES:
E.A. McCloskey
K.H. Thomas

INVENTOR
James T. Carleton.
BY
Ezra Savage
ATTORNEY

April 27, 1954  J. T. CARLETON  2,677,097
REGULATOR SYSTEM FOR GENERATORS
Filed Feb. 5, 1953

WITNESSES:
E. A. McCloskey.
R. H. Thomas

INVENTOR
James T. Carleton.
BY
Ezra W. Savage
ATTORNEY

April 27, 1954 J. T. CARLETON 2,677,097
REGULATOR SYSTEM FOR GENERATORS
Filed Feb. 5, 1953 3 Sheets-Sheet 3

Fig.5.

WITNESSES:
E. A. McCloskey
K. W. Thomas

INVENTOR
James T. Carleton.
BY
Ezra W. Savage
ATTORNEY

Patented Apr. 27, 1954

2,677,097

UNITED STATES PATENT OFFICE 2,677,097

REGULATOR SYSTEM FOR GENERATORS

James T. Carleton, Pittsburgh, Pa., assignor to Westinghouse Electric Corporation, East Pittsburgh, Pa., a corporation of Pennsylvania Application February 5, 1953, Serial No. 335,372

10 Claims. (Cl. 323—19)

This invention relates to regulator systems and more particularly to means for stabilizing such regulator systems.

Heretofore various means have been provided in order to stabilize regulator systems. For instance, a damping transformer is so connected in the regulator system as to introduce a damping signal in the first stage of the regulator system. However, when saturable reactors or other ripple generating devices are utilized in the regulator system, considerable ripple voltage is also introduced into this first stage of the regulator system, which ripple voltage affects the operation of the first stage of the regulator system as well as subsequent stages. Thus, the regulating action of the regulator system is detrimentally affected. Not only is the operation of the regulator system detrimentally affected by providing a damping transformer for stabilizing purposes, but the original cost of the damping transformer is oftentimes considerable. Further, in cases where the damping transformer is large in size it occupies much needed space.

It is also old in the art to provide RC differentiating circuits in order to stabilize regulator systems. However, when utilizing such RC differentiating circuits in a regulator system having incorporated therein saturable reactors or other ripple generating devices, a large amount of ripple voltage is also introduced into the first stage of the regulator system with the same detrimental effects as mentioned above.

An object of this invention is to provide for stabilizing a regulator system having a sequence of stages of amplification, by inducing a voltage in a damping winding of one of the aforementioned stages of amplification that is proportional to the derivative or rate of change of the output voltage of this stage and by passing the current resulting from this induced voltage to a preceding aforementioned stage of amplification so that such current flow produces a flux that opposes the change in flux produced in this preceding stage by a sudden change in the input to the aforementioned sequence of stages of amplication.

Another object of this invention is to provide for increasing the initial speed of response of a regulator system having a sequence of stages of amplification, by delaying the current induced in a damping winding of one of the aforementioned stages of amplification, the induced current effecting a flux in a preceding aforementioned stage of amplification that opposes a change in the resultant flux in this preceding stage of amplification.

A further object of this invention is to provide for stabilizing a regulator system having a sequence of amplification and to provide for improving the regulating action of the system, by providing a push-pull saturable reactor for one of the aforementioned stages and so disposing damping windings thereon that the combined or resultant ripple voltage induced in the damping windings is negligible while the desired resultant voltage of given polarity induced in the damping windings effects a current flow to a preceding aforementioned stage of amplification so that such current flow produces a flux which opposes a change in the resultant flux in this preceding stage of amplification.

Other objects of this invention will become apparent from the following description when taken in conjunction with the accompanying drawings in which.

Figure 1:
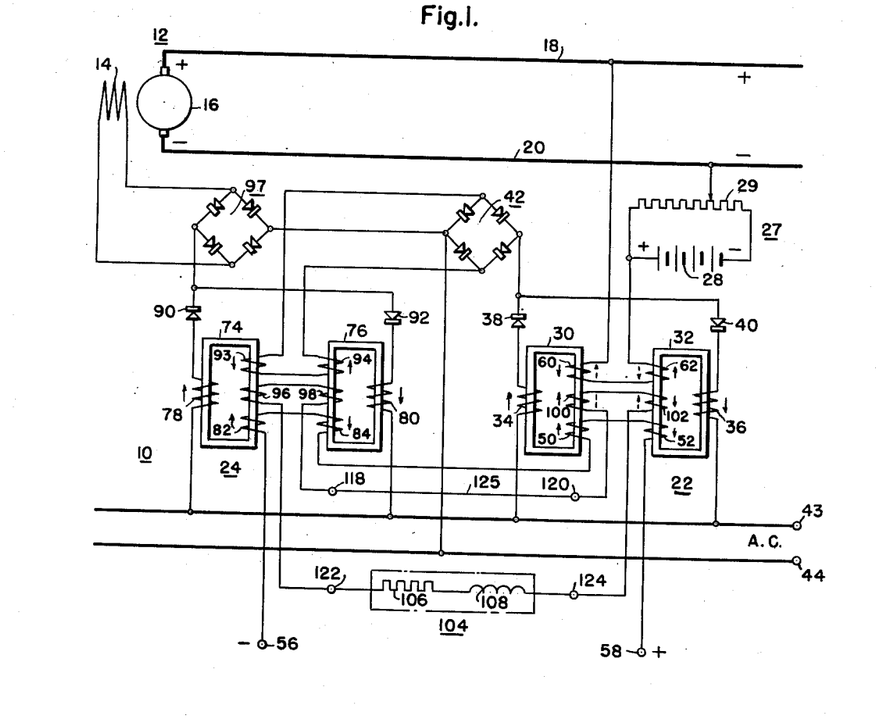
Figure 1 is a schematic diagram of circuits and apparatus illustrating an embodiment of the teachings of this invention.

Referring to Fig. 1 of the drawings, this embodiment of the invention is illustrated with reference to a regulator system 10 for maintaining the output voltage of a direct current generator 12 substantially constant. In this instance, the generator 12 is provided with a field winding 14 and an armature 16 which is disposed to supply energy to load conductors 18 and 20.

In general, the regulator system 10 comprises two amplifiers or stages of amplification, 22 and 24, the first stage of amplification 22 being responsive to the output voltage of the generator 12, and the field winding 14 of the generator 12 being responsive to the output of the last stage of amplification 24. As is well known in the art, the output voltage of the generator 12 is compared with a reference voltage. In this instance the reference voltage is established by a reference network 27 comprising a battery 28 and a variable resistor 29 connected across the battery 28. For purposes of simplifying the description of the operation of the regulator system 10, it is assumed that the amplifiers 22 and 24 and the variable resistor 29 of the reference network 27 are so adjusted that when the output voltage of the generator 12 is at its regulated value the regulating signal to the first stage of amplification 22 is of zero magnitude.

In this instance, the amplifier or first stage of amplification 22 is a saturable reactor and more particularly a magnetic amplifier of the self-saturating type. As can be seen from the drawings, the amplifier 22 comprises two rectangular core members 30 and 32 constructed of magnetic core material. Load windings 34 and 36 are disposed in inductive relationship with the core members 30 and 32, respectively, and in order to insure that current flows in only one direction through the load windings 34 and 36, self-saturating rectifiers 38 and 40 are connected in series circuit relationship with the load windings 34 and 36, respectively.

For the purpose of obtaining a direct current output from the amplifier 22, a full-wave dry type rectifier 42 is connected in circuit relationship with the amplifier 22 and with a suitable source of alternating current (not shown) connected to the terminals 43 and 44. In particular, the terminal 43 is connected to the junction point of the load windings 34 and 36 and the junction point of the rectifiers 38 and 40 is connected to one of the input terminals of the rectifier 42. The other input terminal of the rectifier 42 is connected to the terminal 44.

In this instance, biasing windings 50 and 52 are disposed in inductive relationship with the core members 30 and 32, respectively. As can be seen from the solid arrows associated with the biasing windings 50 and 52, these biasing windings are so wound on their respective core members 30 and 32 and so connected to terminals 56 and 58 for receiving a direct current source of energy (not shown) that current flows through the biasing windings 50 and 52 to produce a flux in the core members 30 and 32, respectively, that opposes the flux produced by the current flow through their respective load windings 34 and 36. As hereinbefore mentioned, the amplifier 22 is responsive to the output voltage of the generator 12. The amplifier 22 is rendered responsive to the output voltage of the generator 12 by disposing control windings 60 and 62 in inductive relationship with the core members 30 and 32, respectively. The control windings 60 and 62 are connected in series circuit relationship with one another, one end of the series circuit being connected to the positive terminal of the generator 12 and the other end of the series circuit being connected to the positive terminal of the battery 28. The negative terminal of the generator 12 is connected to the variable resistor 29 which can be adjusted to obtain the desired regulated output voltage for the generator 12.

As illustrated, the amplifier 24 is also a saturable reactor and more particularly a magnetic amplifier of the saturating type. The amplifier 24 comprises rectangular core members 74 and 76 which have disposed in inductive relationship therewith load windings 78 and 80, respectively, and biasing windings 82 and 84, respectively. In this instance the biasing windings 82 and 84 are likewise connected to the terminals 56 and 58 and the biasing windings 82 and 84 are so disposed on their respective core members 74 and 76 that current flow therethrough produces a flux in the core members 74 and 76, respectively, that opposes the flux produced by the current flow through the load windings 78 and 80, respectively. Self-saturation is obtained by connecting self-saturating rectifiers 90 and 92 in series circuit relationship with the load windings 78 and 80, respectively.

In order to render the second stage of amplification 24 responsive to the first stage of amplification 22, control windings 93 and 94 are disposed in inductive relationship with the core members 74 and 76, respectively, the control windings 93 and 94 being connected in series circuit relationship across the output terminals of the rectifier 42. As illustrated, a full-wave dry type rectifier 97 is provided in order to obtain a direct current output from the second stage of amplification 24. In particular, one of the input terminals of the rectifier 97 is connected to the junction point of the self-saturating rectifiers 90 and 92 and the junction point of the load windings 78 and 80 is connected to the terminal 43. The other input terminal of the rectifier 97 is connected to the associated terminal 44. Further, the field winding 14 of the generator 12 is responsive to the direct current output of the rectifier 97, one end of the field winding 14 being connected to one of the output terminals of the rectifier 97 and the other end of the field winding 14 being connected to the other output terminal of the rectifier 97.

In accordance with the teachings of this invention, damping windings 96 and 98 are disposed in inductive relationship with the core members 74 and 76, respectively, of the second stage of amplification 24. Likewise in accordance with the teachings of this invention, control windings 100 and 102 are disposed in inductive relationship with the core members 30 and 32, respectively, of the first stage of amplification 22. In particular, the damping windings 96 and 98 of the amplifier 24 are connected in series circuit relationship with the control windings 100 and 102 of the amplifier 22 and with a current delay network 104, comprising a resistor 106 and an inductance member 108, the function of which will be described hereinafter. By interconnecting the damping windings 96 and 98 of the second stage of amplification 24 with the control windings 100 and 102 of the first stage of amplification 22, flux is established in the core members 30 and 32 of the first stage of amplification 22 on the occurrence of a sudden change in the output voltage of the generator 12, which flux opposes the change in flux in the core members 30 and 32 as produced by the current flow through the control windings 60 and 62 which are responsive to a result of the output voltage of the generator 12, to thereby render the regulator system 10 stable.

The manner in which the damping windings 96 and 98 of the amplifier 24 and the control windings 100 and 102 of the amplifier 22 stabilize the regulator system 10 can be more clearly understood by a discussion of the operation of the regulator system 10. Assume for purposes of description that the amplifiers 22 and 24 are so adjusted that when the output voltage of the generator 12 is at its regulated value, the current flow through the control windings 60 and 62 of the amplifier 22 is of zero magnitude. Assuming the output voltage of the generator 12 suddenly increases, as may be caused by a reduction of load, to a value above its regulated value, current will flow through the control windings 60 and 62 of the amplifier 22 in such a direction as to produce flux in the core members 30 and 32 respectively, that opposes the flux produced in these core members by the current flow through the load windings 34 and 36, respectively. Such an action decreases the output current from the first stage of amplification 22 and thus decreases the magnitude of the current flow through the control windings 93 and 94 of the second stage of amplification 24. The control windings 93 and 94 of the second stage of amplification 24 are so disposed on their respective core members 74 and 76 that the decrease in flux resulting from the decrease of current flow through the control windings 93 and 94 effects a decrease in the output from the second stage of amplification 24 and thus a decrease in the current flow through the field winding 14 of the generator 12 to thereby return its output voltage to the regulated value. It is to be noted that with a sudden decrease in the current flow through the control windings 93 and 94, a voltage is induced in the associated damping windings 96 and 98, which is proportional to the derivative or rate of change of the output voltage of the second stage of amplification 24, the induced voltage effecting a current flow from the damping windings 96 and 98 to the control windings 100 and 102 of the first stage of amplification 22. The control windings 100 and 102 are so disposed on their respective core members 30 and 32 that this current flow through them effects a flux in their respective core members 30 and 32 which opposes the increased flux produced in the core members 30 and 32 by the sudden increase in the current flow through the control windings 60 and 62 of the first stage of amplification. With the reference network 27 so adjusted that at the regulated output voltage of the generator 12 no current flows through the control windings 60 and 62 of the amplifier 22, the direction of the flux in the core members 30 and 32 due to the current flow through the control windings 60, 62, 100 and 102, when the output voltage of the generator 12 suddenly increases to a value above its regulated value, is indicated by the dotted arrows associated with these control windings.

On the other hand, assuming the output voltage of the generator 12 suddenly decreases, as may be caused by an increase of load, to a value below its regulated value, current will flow in such a direction through the control windings 60 and 62 of the first stage of amplification 22 as to produce flux in their respective core members 30 and 32 in a direction as represented by the solid arrows associated therewith. This flux increases the output from the first stage of amplification 22 and thus increases the magnitude of the current flow through the control windings 93 and 94 of the second stage of amplification 24 to thereby increase its output current to the field winding 14 of the generator 12 and thus return the output voltage of the generator 12 to the regulated value. A sudden increase in the magnitude of the current flow through the control windings 93 and 94 of the second stage of amplification 24 causes a voltage to be induced in the damping windings 96 and 98, which is proportional to the derivative or rate of change of the output voltage of the second stage of amplification 24, the induced voltage effecting a current flow in such a direction through the control windings 100 and 102 of the first stage of amplification 22 that flux is established in the core members 30 and 32, respectively, in a direction to oppose the flux produced in these core members 30 and 32, respectively, by the sudden decrease in the output voltage of the generator 12 below its regulated value. The direction of the flux in the core members 30 and 32 as produced by the current flow through the control windings 100 and 102 of the first stage of amplification 22 as a result of the sudden decrease in the output voltage of the generator 12 below its regulated value is represented by the solid arrows associated with the control windings 100 and 102.

As hereinbefore mentioned, a current delay network 104 is interconnected with the damping windings 96 and 98 of the amplifier 24 and with the control windings 100 and 102 of the amplifier 22. The function of the current delay network 104 can be better understood by reference to Fig. 3 of the drawings. For instance, assume it is desired to increase the regulated output voltage of the generator 12. This is accomplished by adjusting the variable resistor 29 of the reference network 27 in such a direction as to effect an unbalance between the output voltage of the generator 12 and the effective voltage produced by the battery 28 so as to increase the output from both the first stage of amplification 22 and the second stage of amplification 24 to thereby increase the current flow through the field winding 14 of the generator 12. The initial speed of response of the regulator system 10 when thus changing to a higher regulated output voltage for the generator 12 varies depending upon what components are incorporated in the regulator system 10. For instance, referring to Fig. 3, if the damping windings 96 and 98 of the amplifier 24 and the control windings 100 and 102 of the amplifier 22 and the current delay network 104 are provided, the initial speed of response of the regulator system 10 is represented by a curve 110. If the damping windings 96 and 98 and the control windings 100 and 102 are provided and connected in series circuit relationship with one another, but the current delay network 104 is not provided, the initial speed of response of the regulator system is as represented by a curve 112. On the other hand, if neither the damping windings 96 and 98, the control windings 100 and 102, nor the current delay network 104 are provided, then the response of the regulator system is represented by a curve 114. By comparing the curves 110 and 112 it is realized that by providing the current delay network 104, the speed of response of the regulator system 10 is considerably increased. Of course, as can be seen from the curve 114, if neither the damping windings 96, 98, the control windings 100, 102, nor the current delay network 104 are provided, the regulator system 10 is very unstable under such a change to a higher regulated output voltage for the generator 12.

Figure 2:
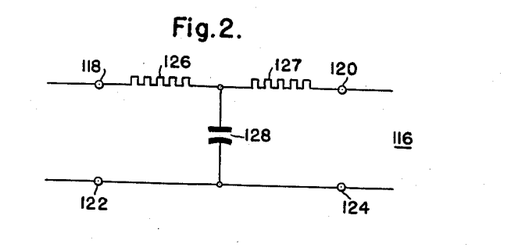
Fig. 2 is a current delay network which can be substituted for the current delay network illustrated in Fig. 1.

Referring to Fig. 2 of the drawings, there is illustrated a current delay network 116 which can be substituted for the current delay network 104 as illustrated in Fig. 1. The current delay network 116 can be connected to the terminals 118, 120, 122 and 124 after having first removed the conductor 125 connected between the terminals 118 and 120 and the current delay network 104 connected between the terminals 122 and 124. As illustrated, the current delay network 116 comprises the series connected resistors 126 and 127 and the capacitor 128. When utilizing the current delay network 116, the current delay is effected by shunting a portion of the current from the second stage of amplification 24 through the capacitor 128.

Figure 4:
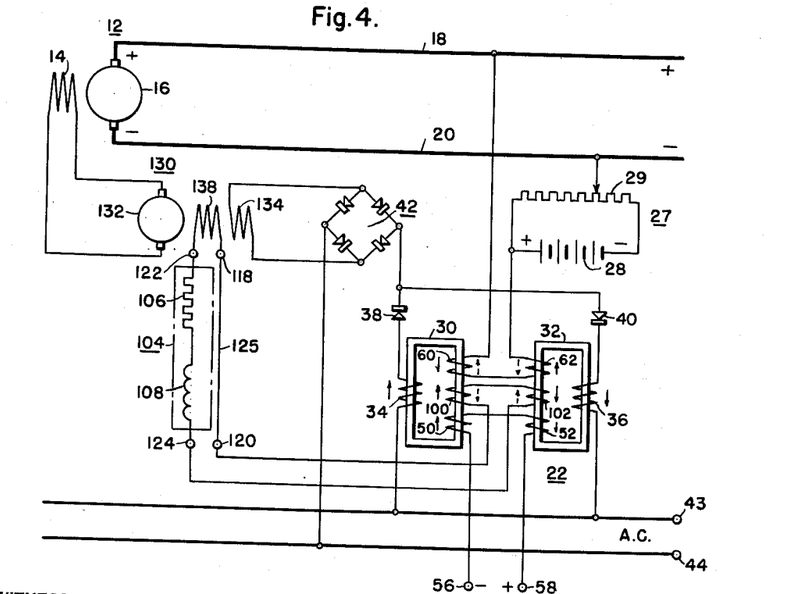
Fig. 4 is a schematic diagram illustrating another embodiment of the teachings of this invention.

Referring to Fig. 4 of the drawings, there is illustrated another embodiment of this invention in which like components of Figs. 1 and 4 have been given the same reference characters. The main distinction between the apparatus illustrated in Figs. 1 and 4 is that in the apparatus of Fig. 1 this invention is applied to two stages of amplification, both of which stages comprise static components while in the apparatus of Fig. 4 this invention is applied to two stages of amplification, the first stage comprising static components and the second stage of amplification comprising a rotating magnetic amplifier or exciter 130. In this instance, the rotating magnetic amplifier 130 includes an armature 132 which is disposed to supply direct current to the field winding 14 of the generator 12. In order to provide a regulating signal for the generator 12, the rotating magnetic amplifier 130 is provided with a control winding 134 which is connected to the output terminals of the rectifier 42 to thereby render the control winding 134 responsive to changes in the output voltage of the generator 12.

In accordance with the teachings of this invention the rotating magnetic amplifier 130 is also provided with a damping winding 138 which is magnetically disposed with respect to the control winding 134 of the amplifier 130. In particular, the damping winding 138 and the control winding 134 are disposed on the pole pieces (not shown) of the rotating magnetic amplifier 130. As illustrated, the damping winding 138 is connected in series circuit relationship with the current delay network 104 and with the control windings 100 and 102 of the first stage of amplification 22. Thus, with a sudden increase or decrease in the output voltage of the generator 12, a voltage is induced in the damping winding 138 of the rotating magnetic amplifier 130 proportional to the derivative of the output voltage of the amplifier 130, which induced voltage effects a current flow through the control windings 100 and 102 of the amplifier 22 in such a direction as to produce a flux in the respective core members 30 and 32 which flux opposes the change in flux in these core members 30 and 32 as produced by a sudden increase or decrease in the output voltage of the generator 12.

Figure 3:
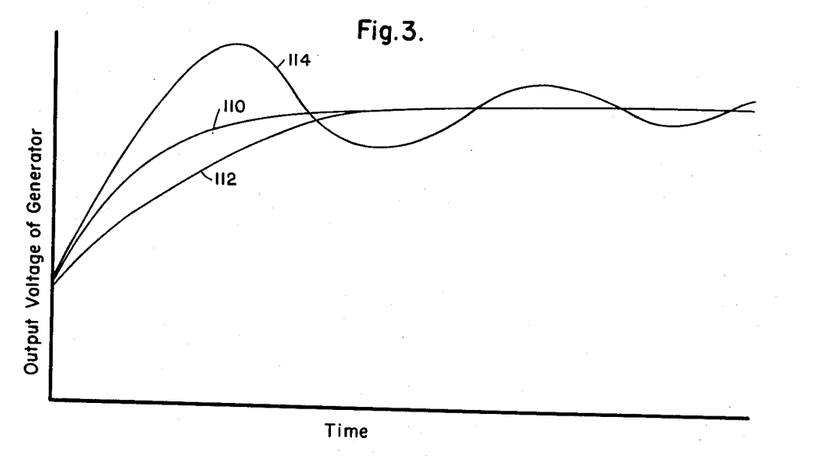
Fig. 3 is a graph illustrating the initial speed of response of the regulating systems illustrated in Figs. 1, 4 and 5 when certain components are incorporated therein.

When the damping winding 138 of the amplifier 130, the current delay network 104 and the control windings 100 and 102 of the first stage of amplification 22 are provided, the initial speed of response of the regulator system illustrated in Fig. 4 is likewise represented by the curve 110 of Fig. 3. However, if the current delay network 104 as illustrated in Fig. 4 is omitted and the damping winding 138 is interconnected with the control windings 100 and 102 of the amplifier 22, the initial speed of response of the regulator system is as represented by the curve 112. On the other hand, if the damping winding 138, the current delay network 104 and the control windings 100 and 102 are omitted from the apparatus illustrated in Fig. 4, the response of the regulator system is as illustrated by the curve 114.

It is to be understood that the current delay network 116 illustrated in Fig. 2 can also be substituted for the current delay network 104 illustrated in Fig. 4 by connecting it to the terminals 118, 120, 122, and 124. Since the damping winding 138, current delay network 104 and the control windings 100 and 102 of the apparatus of Fig. 4 function in the same manner and provide the same stabilizing effect as do the damping windings 96, 98, the current delay network 104, and the control windings 100 and 102 of the apparatus of Fig. 1, a further description of the apparatus of Fig. 4 is deemed unnecessary.

Figure 5:
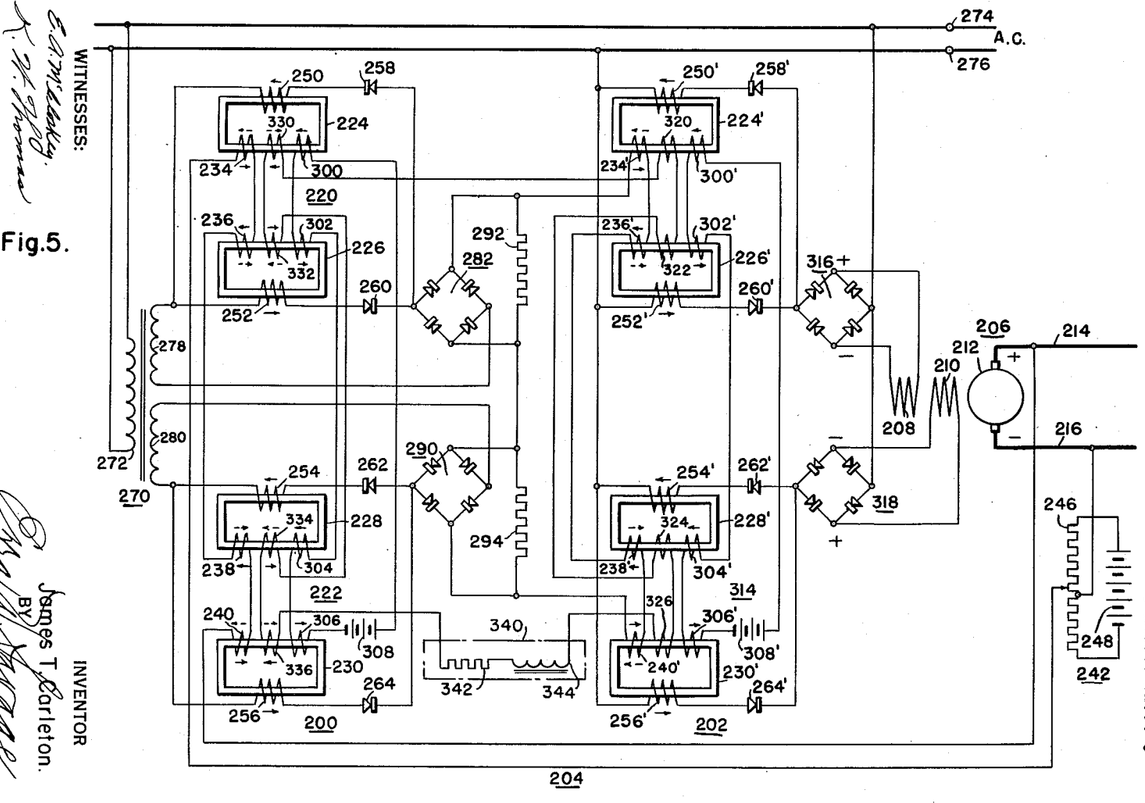
Fig. 5 is a schematic diagram illustrating still another embodiment of the teachings of this invention.

Referring to Fig. 5, this invention is illustrated as applied to push-pull saturable reactors 200 and 202, the saturable reactor 200 constituting the first stage of amplification and the saturable reactor 202 constituting the second stage of amplification. In particular, the saturable reactors 200 and 202 are push-pull magnetic amplifiers of the self-saturating type and constitute the two stages of amplification for a regulator system 204 which maintains the output voltage of a direct current generator 206 substantially constant. In this instance, the generator 206 comprises a field winding divided into two sections 208 and 210 and an armature 212 connected to supply direct current energy to load conductors 214 and 216.

Referring more particularly to the push-pull magnetic amplifier 200, this amplifier comprises two main sections 220 and 222. The section 220 comprises two rectangular core members 224 and 226 constructed of magnetic core material, while the section 222 comprises two rectangular core members 228 and 230 constructed of magnetic core material.

In order to render the push-pull magnetic amplifier 200 responsive to a change in the output voltage of the generator 206, control windings 234, 236, 238 and 240 are disposed in inductive relationship with the core members 224, 226, 228 and 230, respectively. As can be seen from the drawing, the control winding 234 is wound oppositely from the control winding 238 and the control winding 236 is wound oppositely from the control winding 240 so that when the output voltage of one of the sections 220 or 222 increases, the output voltage of the other section will decrease.

As illustrated, the control windings 234, 236, 238 and 240 are all connected in series circuit relationship with one another, one end of the series circuit being connected to the load conductor 214 and the other end of the series circuit being connected through a voltage reference network 242 to the load conductor 216. As illustrated, the voltage reference network 242 comprises a variable resistor 246 and a battery 248 connected across the variable resistor 246. The functioning of the voltage reference network 242 will be described hereinafter.

Load windings 250, 252, 254 and 256 are also disposed in inductive relationship with the core members 224, 226, 228 and 230 respectively. Self-saturation for the amplifier 200 is obtained by connecting self-saturating rectifiers 258, 260, 262, and 264 in series circuit relationship with the load windings 250, 252, 254 and 256, respectively. For the purpose of supplying energy to the load windings 250, 252, 254 and 256 of the amplifier 200, a potential transformer 270 is provided. In this instance, the potential transformer 270 comprises a primary winding 272 which is connected to terminals 274 and 276 which in turn are connected to a suitable source of alternating current (not shown). The potential transformer 270 also comprises a secondary winding having two sections 278 and 280.

In order to obtain a direct current voltage that is a measure of the output of the section 220 of the amplifier 200, a full-wave dry-type rectifier 282 is provided. In particular, one of the input terminals of the rectifier 282 is connected to one end of the section 278 of the potential transformer 270 while the other end of the section 278 is connected to the junction point of the load windings 250 and 252, the junction point of the self-saturating rectifiers 258 and 260 being connected to the other input terminal of the rectifier 282.

On the other hand, to obtain a direct current voltage that is a measure of the output of the section 222 of the amplifier 200, a full-wave dry-type rectifier 290 is provided. In particular, one of the input terminals of the rectifier 290 is connected to one end of the winding section 280 of the transformer 270. The other end of the section 280 is connected to the junction point of the load windings 254 and 256 and the junction point of the self-saturating rectifiers 262 and 264 is connected to the other input terminal of the rectifier 290. As illustrated, a resistor 292 is connected across the output terminals of the rectifier 282 and a resistor 294 is connected across the output terminal of the rectifier 290, the resistors 292 and 294 being so connected together that the resultant direct current voltage across the resistors 292 and 294 combined is a measure of the difference in the outputs from the sections 220 and 222 of the amplifier 200.

Biasing windings 300, 302, 304 and 306 are disposed in inductive relationship with the core members 224, 226, 228 and 230, respectively. As illustrated, the biasing windings 300, 302, 304 and 306 are connected in series circuit relationship with one another, the series circuit being connected across a suitable direct current source 308. The biasing windings 300, 302, 304 and 306 are so disposed on their respective core members that current flow through these biasing windings produces a flux in the respective core members that opposes the flux produced by the current flow through the associated load windings 250, 252, 254 and 256, respectively. This can be better seen by reference to the solid arrows associated with these various load and biasing windings.

Since the push-pull magnetic amplifier 202 in many respects is identical to the push-pull magnetic amplifier 200, like components of the amplifiers 200 and 202 have been given the same reference character except that those like components of the amplifier 202 have a prime associated with the reference character. However, the direct current output voltages of the sections 312 and 314 of the amplifier 202 are not compared in the same way as the direct current output voltages of the sections 220 and 222 of the amplifier 200. In particular, the outputs of the sections 312 and 314 of the amplifier 202 oppose one another in the field winding sections 208 and 210 of the generator 206. As illustrated, a full-wave dry-type rectifier 316 is provided in order to obtain a direct current output from the section 312 of the amplifier 202 while a full-wave dry-type rectifier 318 is provided in order to obtain a direct current output from the section 314 of the amplifier 202. As can be seen from the drawings, one of the input terminals of the rectifier 316 is connected to the terminal 274 for receiving a suitable source of alternating current (not shown). The other input terminal of the rectifier 316 is connected to the junction point of the self-saturating rectifiers 258' and 260', the circuit to the load windings 250' and 252' of the section 312 being completed by connecting the junction point of these load windings to the terminal 276. One of the input terminals of the rectifier 318 is likewise connected to the terminal 274, the other input terminal of the rectifier 318 being connected to the junction point of the self-saturating rectifiers 262' and 264', the energizing circuit for the load windings 254' and 256' of the section 314 being completed by connecting the junction point of the load windings 254' and 256' to the terminal 276.

In order to render the control windings 234', 236', 238' and 240' of the second stage of amplification 202 responsive to the direct current output voltage of the first stage of amplification 200, the control windings 234', 236', 238' and 240' are connected in series circuit relationship with one another, one end of the series circuit being connected to one end of the resistor 294 and the other end of the series circuit being connected to one end of the resistor 292.

In accordance with the teachings of this invention, damping windings 320, 322, 324 and 326 are disposed in inductive relationship with the core members 224', 226', 228' and 230', respectively, of the second stage of amplification 202. Likewise, in accordance with the teachings of this invention, control windings 330, 332, 334 and 336 are disposed in inductive relationship with the core members 224, 226, 228 and 230, respectively, of the first stage of amplification 200. In order to render the control windings 330, 332, 334 and 336 of the first stage of amplification 200 responsive to the current induced in the damping windings 320, 322, 324 and 326 of the second stage of amplification 202 when there is a sudden change in the output voltage of the generator 206, these damping and control windings are interconnected with one another. In particular, a current delay network 340 comprising a resistor 342 and an inductance member 344 is connected in series circuit relationship with the damping windings 320, 322, 324 and 326, and with the control windings 330, 332, 334 and 336 in order to delay the current induced in the damping windings 320, 322, 324 and 326.

By providing the damping windings 320, 322, 324 and 326, and the control windings 330, 332, 334 and 336, and so disposing and interconnecting them as illustrated in Fig. 5, a very stable regulator system is provided. In addition, by so disposing the damping windings 320, 322, 324 and 326 on the respective core members of a push-pull saturable reactor such as the push-pull magnetic amplifier 202, the ripple flux produced in the core members 224', 226', 228' and 230' by the ripple current flowing through the load windings 250', 252', 254' and 256' respectively, does not affect the operation of the regulator system 204. The reason for this is that the ripple voltage induced in the damping windings 320, 322, 324 and 326 as a result of this ripple flux in the core members 224', 226', 228' and 230', respectively, is cancelled out since the ripple voltage induced in the damping windings 320 and 322 of the section 312 is of opposite polarity to that voltage induced in the damping windings 324 and 326 of the section 314 of the second stage of amplification 202.

The manner in which the damping windings 320, 322, 324 and 326 and the control windings 330, 332, 334 and 336 function to stabilize the regulator system 204 can be better understood by considering the operation of the regulator system 204. For instance, assuming for purposes of description the variable resistor 246 of the reference network 242 is positioned as illustrated in Fig. 5 so that the battery 248 is not effectively connected in circuit with the first stage of amplification 200, and the output voltage of the generator 206 is to be regulated for zero output voltage. Under such conditions the input current to the control windings 234, 236, 238 and 240 of the first stage of amplification is of zero magnitude and the input current to the control windings 234', 236', and 238' and 240' is also of substantially zero magnitude. Therefore, whatever effect is produced by the field winding section 208 of the generator 206 is cancelled by the effect produced by the field winding section 210 and thus the output voltage of the generator 206 remains at zero magnitude.

Assuming the output voltage of the generator 206 increases in the direction as indicated by the polarity signs on the generator 206, current will flow in such a direction through the control windings 234, 236, 238 and 240 of the first stage of amplification 200, as to increase the direct current output voltage of the section 222 of the amplifier 200 and to decrease the direct current output voltage of the section 220. With an increase in the direct current voltage across the resistor 294, current flows in such a direction through the control windings 234', 236', 238' and 240 of the second stage of amplification 202, that the output current of the section 314 of the second stage of amplification 202 is increased and the output current of the section 312 of the amplifier 202 is decreased, to thereby increase the current flow through the field winding section 210 of the generator 206 and decrease the current flow through the field winding section 208 of the generator 206. The latter action returns the output voltage of the generator 206 to its regulated value.

When the output voltage of the generator 206 suddenly increases in a direction as indicated by the polarity signs on the generator 206, a voltage is induced in the damping windings 320, 322, 324 and 326 of the second stage of amplification 202, which is proportional to the derivative or rate of change of the output voltage of the amplifier 202 the induced voltage effecting a current flow through the control windings 330, 332, 334 and 336 of the first stage of amplification 200, that produces a flux in the core members 224, 226, 228 and 230, respectively, which opposes the flux produced in the core members 224, 226, 228 and 230, respectively, by the increase in the current flow to the control windings 234, 236, 238 and 240 of the first stage of amplification 200. With such an increase in the output voltage of the generator 206, the direction of the flux in the core members 224, 226, 228 and 230 of the first stage of amplification 200 as produced by the current flow through the control windings 234, 236, 238, 240, 330, 332, 334 and 336, is as indicated by the dotted arrows associated with these control windings.

On the other hand, assuming the output voltage of the generator 206 suddenly decreases to a value below its regulated output voltage of substantially zero magnitude so that the polarity of the generator is opposite from that illustrated in Fig. 5, then the output current from the section 220 of the first stage of amplification 200 and the output current from the section 312 of the second stage of amplification 202 would increase and the output current from the section 222 of the first stage of amplification 200 and the output current from the section 314 of the second stage of amplification 202 would decrease, to thereby increase the current flow through the field winding section 208 of the generator 206 and decrease the current flow through the field winding section 210 to thus return the output voltage of the generator 206 to its regulated value.

With such a sudden decrease in the output voltage of the generator 206 below its regulated value, voltages are induced in the damping windings 320, 322, 324 and 326 of the second stage of amplification 202 so as to effect a current flow through the control windings 330, 332, 334 and 336 of the first stage of amplification 200 in such a direction as to produce a flux that opposes the flux produced by the current flow through the control windings 234, 236, 238 and 240 of the amplifier 200. With such a sudden decrease in the output voltage of the generator 206 below its regulated value, the direction of the flux in the core members 224, 226, 228 and 230 as produced by the current flow through the control windings 234, 236, 238, 240, 330, 332, 334 and 336 is indicated by the solid arrows associated with these control windings.

The effect of adjusting the variable resistor 246 of the reference network 242 in order to increase the output voltage of the generator 206 to a value other than one of zero magnitude can also be seen by referring to Fig. 3. The initial speed of response of the regulator system 204 when moving to such a new value of output voltage for the generator 206 is as represented by the curve 110 assuming the damping windings 320, 322, 324 and 326 of the second stage of amplification 202, the control windings 330, 332, 334 and 336 of the first stage of amplification 200, and the current delay network 340 are provided. If the current delay network 340 is omitted, and these damping windings 320, 322, 324 and 326 and control windings 330, 332, 334 and 336 are provided, the initial speed of response of the regulator system 204 is as indicated by the curve 112. However, if neither the damping windings 320, 322, 324, 326, the control windings 330, 332, 334 and 336, nor the current delay network 340 are provided, then the response of the regulator system 204 is as represented by the curve 114. Thus, when the current delay network 340 and its interconnected control and damping windings are provided the regulator system is stable and it has a good initial speed of response. Since before adjusting the variable resistor 246 of the reference network 242 it was assumed that the regulator system 204 was adjusted so that the regulated output voltage of generator 206 was substantially zero, the curves 110, 112 and 114 should be shifted vertically downwardly so as to start at zero output voltage for the generator 206 in order to make the curves 110, 112 and 114 of Fig. 3 truly representative in view of the conditions assumed.

It is to be understood that although this invention has been described with reference to maintaining the output voltage of a direct current generator substantially constant, this invention is applicable to regulator systems in general.

The apparatus involving the teachings of this invention has several advantages. For instance, the regulator systems illustrated in Figs. 1 and 4 are very stable and have a good initial speed of response when the output voltage of their respective generators is changed to a new regulated value. In the apparatus illustrated in Fig. 5, the above-mentioned advantages are obtained as well as the additional advantage of not having substantially any ripple current flowing from the damping windings 320, 322, 324 and 326 of the second stage of amplification 202 to the control windings 330, 332, 334 and 336 of the first stage of amplification 200. By substantially reducing this ripple current as is done in the apparatus illustrated in Fig. 5, a superior regulating operation is obtained.

Since numerous changes may be made in the above-described apparatus and circuits and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a regulator system, the combination comprising, a sequence of stages of amplification for amplifying a regulating signal which effects a restoration of a quantity to its regulated value, one of said stages of amplification comprising a control winding and a damping winding disposed in inductive relationship with one another, another of said stages of amplification that precedes said one of said stages of amplification comprising two control elements, the control winding of said one of said stages of amplification being responsive to the output of said another of said stages of amplification and one of the control elements of said another of said stages of amplification being responsive to the regulating signal, and a current delay network connected in circuit relationship with the damping winding and with the other control element of said another of said stages of amplifications so as to delay the current flowing into said another control element, the damping winding being so magnetically disposed with respect to the control winding of said one of said stages of amplification that with a sudden change in the magnitude of the regulating signal a voltage is induced in the damping winding proportional to the derivative of the output voltage of said one of said stages of amplification, which induced voltage effects a current flow through said other control element which current flow produces a signal in said another of said stages of amplification in opposition to the sudden change in the magnitude of the regulating signal.

2. In a regulator system, the combination comprising, a sequence of stages of amplification for amplifying a regulating signal which effects a restoration of a quantity to its regulated value, one of said stages of amplification comprising a saturable reactor which includes magnetic core means, a control winding disposed in inductive relationship with the magnetic core means and responsive to the regulating signal, and a load winding disposed in inductive relationship with the magnetic core means, another of said stages of amplification subsequent to said one of said stages of amplification comprising an amplifier having a damping winding and a control winding disposed in inductive relationship with one another, circuit means for rendering the control winding of said amplifier responsive to the magnitude of the current flow through said load winding when said load winding is connected to a suitable source of alternating current, another control winding disposed in inductive relationship with the magnetic core means of the saturable reactor, and a current delay network connected in circuit relationship with said another control winding and with the damping winding of said amplifier, the damping winding being so magnetically disposed with respect to the control winding of said amplifier that with a sudden change in the magnitude of the current flow through said control winding disposed in inductive relationship with the magnetic core means and responsive to the regulating signal, a voltage is induced in the damping winding proportional to the derivative of the output voltage of said amplifier, which induced voltage effects a current flow through said another control winding which produces a flux in the magnetic core means of the saturable reactor that opposes the change in flux produced by the sudden change in the magnitude of the current flow through said control winding disposed in inductive relationship with the magnetic core means and responsive to the regulating signal.

3. In a regulator system, the combination comprising, a sequence of stages of amplification for amplifying a regulating signal which effects a restoration of a quantity to its regulated value, one of said stages of amplification comprising a saturable reactor which includes magnetic core means, a control winding disposed in inductive relationship with the magnetic core means and responsive to the regulating signal, and a load winding disposed in inductive relationship with the magnetic core means, another of said stages of amplification subsequent to said one of said stages of amplification comprising another saturable reactor having magnetic core means, a damping winding disposed in inductive relationship with the magnetic core means of said another saturable reactor, a control winding disposed in inductive relationship with the magnetic core means of said another saturable reactor, a load winding disposed in inductive relationship with the magnetic core means of said another saturable reactor, circuit means for rendering the control winding of said another saturable reactor responsive to the magnitude of the current flow through the load winding of said saturable reactor and for connecting said load windings to a suitable source of alternating current, another control winding disposed in inductive relationship with the magnetic core means of said saturable reactor, and a current delay network connected in circuit relationship with said another control winding and with said damping winding, said damping winding being so magnetically disposed with respect to the control winding of said another saturable reactor that with a sudden change in the magnitude of the current flow through the control winding of said saturable reactor a voltage is induced in said damping winding proportional to the derivative of the output voltage of said another saturable reactor, which induced voltage effects a current flow through said another control winding which produces a flux in the magnetic core means of said saturable reactor that opposes the change in flux produced by the sudden change in the magnitude of the current flow through the control winding of said saturable reactor.

4. In a regulator system, the combination comprising, a sequence of stages of amplification for amplifying a regulating signal which effects a restoration of a quantity to its regulated value, one of said stages of amplification comprising a saturable reactor which includes magnetic core means, a control winding disposed in inductive relationship with the magnetic core means and responsive to the regulating signal, and a load winding disposed in inductive relationship with the magnetic core means, another of said stages of amplification subsequent to said one of said stages of amplification comprising a rotating magnetic amplifier, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, and a current delay network connected in circuit relationship with said another control winding and with said damping winding, said damping winding being so magnetically disposed with respect to the control winding of the rotating magnetic amplifier that with a sudden change in the magnitude of the current flow through the control winding disposed in inductive relationship with the magnetic core means and responsive to the regulating signal, a voltage is induced in the damping winding proportional to the derivative of the output voltage of the rotating magnetic amplifier, which induced voltage effects a current flow through said another control winding which produces a flux in the magnetic core means of the saturable reactor that opposes the change in the flux produced by the sudden change in the magnitude of the current flow through the control winding disposed in inductive relationship with the magnetic core means and responsive to the regulating signal.

5. In a regulating system for maintaining the output voltage of a generator having a field winding substantially constant, the combination comprising, a saturable reactor including magnetic core means, a control winding disposed in inductive relationship with the magnetic core means and responsive to the output of the generator, and a load winding disposed in inductive relationship with the magnetic core means, another saturable reactor having magnetic core means, a damping winding disposed in inductive relationship with the magnetic core means of said another saturable reactor, a control winding disposed in inductive relationship with the magnetic core means of said another saturable reactor, a load winding disposed in inductive relationship with the magnetic core means of said another saturable reactor, circuit means for rendering the control winding of said another saturable reactor responsive to the magnitude of the current flow through the load winding of said saturable reactor and for rendering the field winding of the generator responsive to the magnitude of the current flow through the load winding of said another saturable reactor when said load windings are connected to a suitable source of alternating current, another control winding disposed in inductive relationship with the magnetic core means of said saturable reactor, and a current delay network comprising a resistor and an inductance member connected in series circuit relationship, the current delay network being connected in circuit relationship with said another control winding and with said damping winding, said damping winding being so magnetically disposed with respect to the control winding of said another saturable reactor that with a sudden change in the flux in the magnetic core means of said another saturable reactor a voltage is induced in said damping winding proportional to the derivative of the output voltage of said another saturable reactor, which induced voltage effects a current flow through said another control winding which produces a flux in the magnetic core means of said saturable reactor that opposes the change in flux produced by a change in the current flow through the control winding of said saturable reactor.

6. In a regulating system for maintaining the output voltage of a generator having a field winding substantially constant, the combination comprising, a saturable reactor including magnetic core means, a control winding disposed in inductive relationship with the magnetic core means and responsive to the output of the generator, and a load winding disposed in inductive relationship with the magnetic core means, another saturable reactor having magnetic core means, a damping winding disposed in inductive relationship with the magnetic core means of said another saturable reactor, a control winding disposed in inductive relationship with the magnetic core means of said another saturable reactor, a load winding disposed in inductive relationship with the magnetic core means of said another saturable reactor, circuit means for rendering the control winding of said another saturable reactor responsive to the magnitude of the current flow through the load winding of said saturable reactor and for rendering the field winding of the generator responsive to the magnitude of the current flow through the load winding of said another saturable reactor when said load windings are connected to a suitable source of alternating current, another control winding disposed in inductive relationship with the magnetic core means of said saturable reactor, and a current delay network comprising a resistor and a capacitor connected in series circuit relationship across the damping winding, and another resistor connected in series circuit relationship with the capacitor across said another control winding, said damping winding being so magnetically disposed with respect to the control winding of said another saturable reactor that with a sudden change in the flux in the magnetic core means of said another saturable reactor a voltage is induced in said damping winding proportional to the derivative of the output voltage of said another saturable reactor, which induced voltage effects a current flow through said another control winding which produces a flux in the magnetic core means of said saturable reactor that opposes the change in flux produced by a change in the current flow through the control winding of said saturable reactor.

7. In a regulating system for maintaining the output voltage of a generator having a field winding substantially constant, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, and a current delay network comprising a resistor and an inductance member connected in series circuit relationship, the current delay network being connected in circuit relationship with said another control winding and with said damping winding, said damping winding being so magnetically disposed with respect to the control winding of the rotating magnetic amplifier that with a sudden change in the magnitude of the current flow through the control winding disposed in inductive relationship with the magnetic core means and responsive to the output of the generator a voltage is induced in the damping winding proportional to the derivative of the output voltage of the rotating magnetic amplifier, which induced voltage effects a current flow through said another control winding which produces a flux in the magnetic core means that opposes the change in flux produced by the sudden change in the magnitude of the current flow through the control winding disposed in inductive relationship with the magnetic core means and responsive to the output of the generator.

8. In a regulating system for maintaining the output voltage of a generator having a field winding substantially constant, the combination comprising, a saturable reactor including magnetic core means, a control winding disposed in inductive relationship with the magnetic core means and responsive to the output of the generator, and a load winding disposed in inductive relationship with the magnetic core means, a rotating magnetic amplifier for supplying energy to the field winding of the generator, the rotating magnetic amplifier having a damping winding and a control winding disposed in inductive relationship with one another, circuit means for rendering the control winding of the rotating magnetic amplifier responsive to the magnitude of the current flow through said load winding when said load winding is connected to a suitable source of alternating current, another control winding disposed in inductive relationship with the magnetic core means of the saturable reactor, and a current delay network comprising a resistor and a capacitor connected in series circuit relationship across the damping winding, and another resistor connected in series circuit relationship with the capacitor across said another control winding, said damping winding being so magnetically disposed with respect to the control winding of the rotating magnetic amplifier that with a sudden change in the magnitude of the current flow through the control winding disposed in inductive relationship with the magnetic core means and responsive to the output of the generator a voltage is induced in the damping winding proportional to the derivative of the output voltage of the rotating magnetic amplifier, which induced voltage effects a current flow through said another control winding which produces a flux in the magnetic core means that opposes the change in flux produced by the sudden change in the magnitude of the current flow through the control winding disposed in inductive relationship with the magnetic core means and responsive to the output of the generator.

9. In a regulating system for maintaining the output voltage of a generator having a field winding substantially constant, the combination comprising, an amplifier of the saturable reactor type including magnetic core means and a control winding disposed in inductive relationship with the magnetic core means and responsive to the output of the generator, a push-pull saturable reactor having two sections, the field winding of the generator being responsive to the output of the two sections of the push-pull saturable reactor, each section of the push-pull saturable reactor including at least one control winding and one damping winding disposed in inductive relationship with one another, circuit means for rendering the control windings of the push-pull saturable reactor responsive to the output of said amplifier, another control winding disposed in inductive relationship with the magnetic core means of said amplifier, and circuit means for connecting a current delay network in circuit relationship with said another control winding and with the damping windings of the push-pull saturable reactor, the damping windings being so disposed that with a sudden change in the magnitude of the current flow through the control winding of said amplifier a voltage is induced in the damping windings proportional to the derivative of the output voltage of the push-pull saturable reactor, which induced voltage effects a current flow through said another control winding which produces a flux in said magnetic core means that opposes the change in flux produced by the sudden change in the magnitude of the current flow through the control winding of said amplifier.

10. In a regulating system for maintaing the output voltage of a generator having a field winding substantially constant, the combination comprising, a first stage push-pull saturable reactor having two sections, each section of the first stage push-pull saturable reactor including magnetic core means and a control winding responsive to the output of the generator and disposed in inductive relationship with the respective magnetic core means, a second stage push-pull saturable reactor having two sections, the field winding of the generator being responsive to the outputs of the two sections of the second stage saturable reactor, each section of the second stage push-pull saturable reactor including magnetic core means and a damping winding and a control winding disposed in inductive relationship with their respective magnetic core means, circuit means for rendering the control windings of the second stage push-pull saturable reactor responsive to the output of the first stage push-pull saturable reactor, another control winding disposed in inductive relationship with each of the magnetic core means of the first stage push-pull saturable reactor, and circuit means for connecting a current delay network in circuit relationship with said another control winding and with the damping windings of the second stage push-pull saturable reactor, the damping windings being so disposed that with a sudden change in the magnitude of the current flow through the control windings of the first stage push-pull saturable reactor a voltage is induced in the damping windings proportional to the derivative of the output voltage of the second stage push-pull saturable reactor, which induced voltage effects a current flow through said another control winding which produces a flux in the respective magnetic core means of the first stage push-pull saturable reactor that opposes the change in flux produced by the sudden change in the magnitude of the current flow through the control windings of the first stage push-pull saturable reactor.

No references cited.